July 10, 1951  C. G. FORMAZ  2,560,022
READILY ADJUSTABLE EXTRUSION DEVICE
Filed March 26, 1947  2 Sheets-Sheet 1
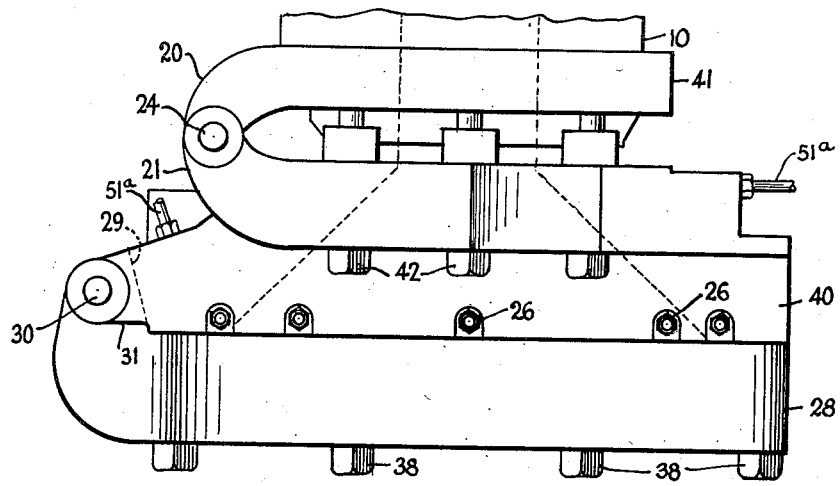
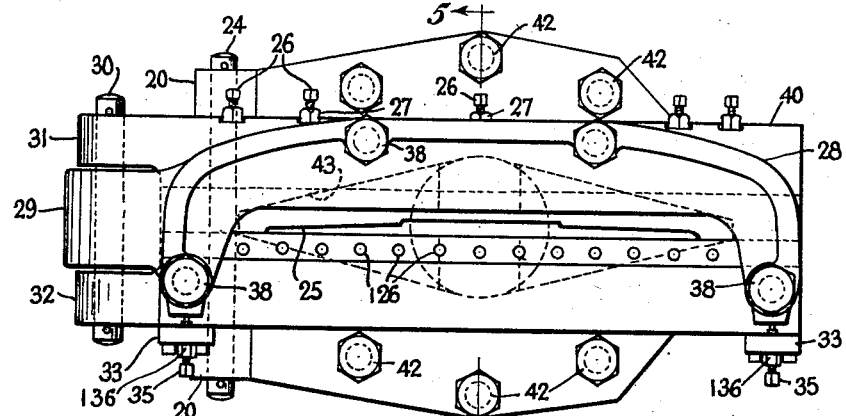
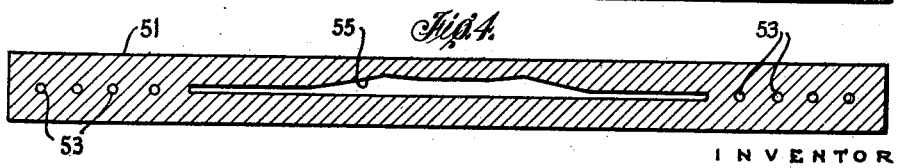
INVENTOR
CONRAD G. FORMAZ
BY
ATTORNEYS July 10, 1951 C. G. FORMAZ 2,560,022
READILY ADJUSTABLE EXTRUSION DEVICE
Filed March 26, 1947 2 Sheets-Sheet 2
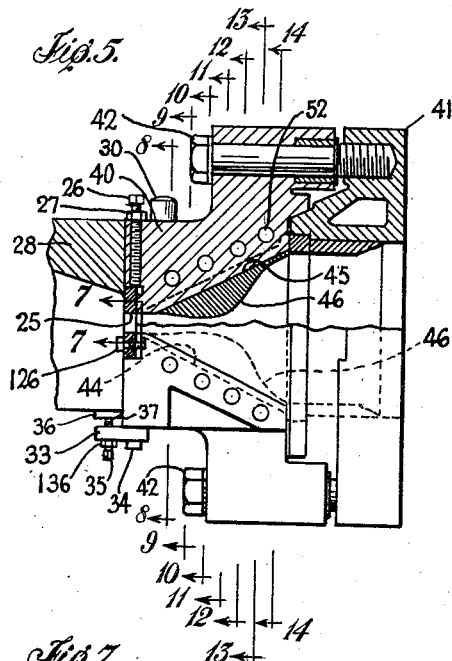
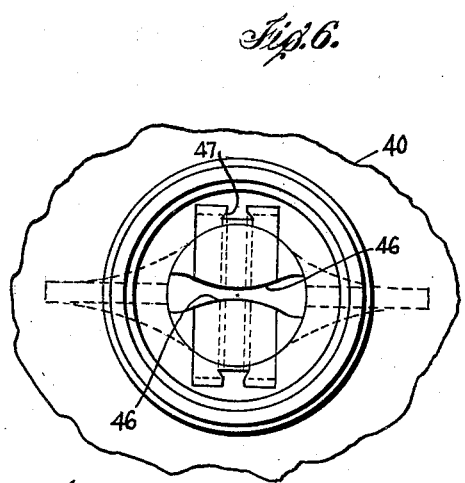
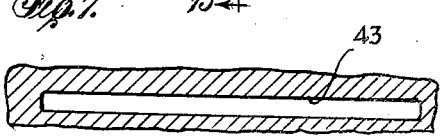
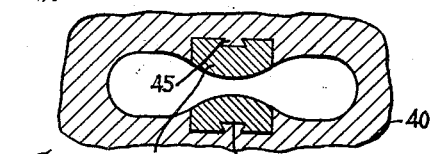
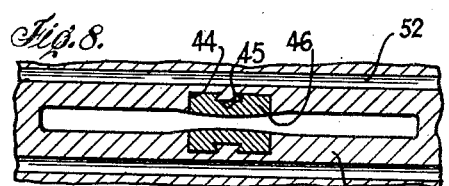
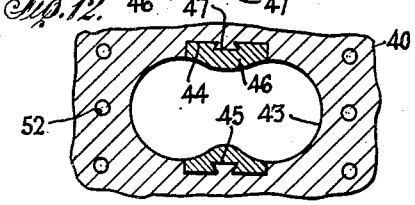
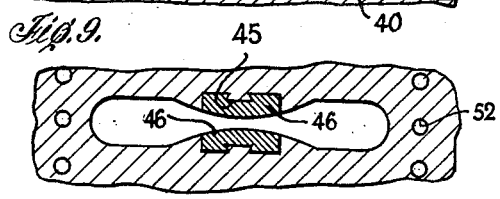
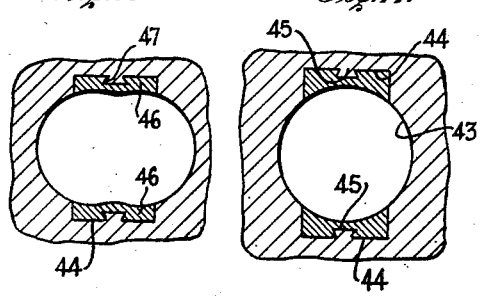
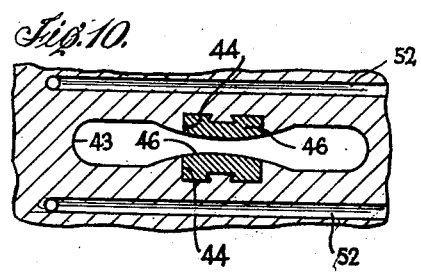
INVENTOR
CONRAD G. FORMAZ
BY *Elyr Frye*
ATTORNEYS Patented July 10, 1951

2,560,022

UNITED STATES PATENT OFFICE 2,560,022

READILY ADJUSTABLE EXTRUSION DEVICE

Conrad G. Formaz, Akron, Ohio, assignor to The Firestone Tire & Rubber Company, Akron, Ohio, a corporation of Ohio Application March 26, 1947, Serial No. 737,365

4 Claims. (Cl. 18—12)

This invention relates to tubing or extruding machines, especially to extrusion machines that can be rapidly changed from the extrusion of one shape to the extrusion of a widely variant shape.

The formation of tread stock for pneumatic tires is one prime example of use for the machine of the invention but it will be realized that the machine can be used for the production of other continuous lengths of plastic material to be formed to desired cross-sectional contours.

In the production of tire treads, the rubber, in plastic condition, is forced through an extrusion die, secured in an extrusion head, by high pressure, and the plastic rubber is formed into a continuous length of a relatively wide, shallow contour, usually varying in thickness laterally of the tread and of minimum depth or thickness at its edge sections. Heretofore, different extrusion heads have been used for each contour or size of tread desired, although in some instances, minor deviations in the tread contour have been produced by changing a die plate associated with the discharge end of the extrusion head. For any appreciable change in size or contour of the extruded material, a new extrusion head would have to be used in place of the head previously used on the machine. As some extruded products may be several inches in thickness and be as much as 24 to 30 inches in width, it will be seen that very high extrusion pressures are used with such extrusion heads, which therefore must be of massive construction, and are usually made from a cast metal block carefully machined and polished to the desired size, with the feed chamber formed in such heads being extremely smooth and a precise, predetermined contour in order to obtain the desired extrusion action. Thus the extrusion heads are quite costly, are somewhat expensive to maintain, and are difficult to change due to their weight and size. It requires several men several hours to change the extrusion head on a large extrusion machine, which, of course, appreciably reduces the production of the machine, especially if the extrusion contour is to be changed very frequently.

The general object of this invention is to avoid and overcome the foregoing and other disadvantages of and objections to known types of extrusion heads, and to provide an extrusion head adapted to be easily modified to generate any of a variety of extrusion shapes and contours.

Another object of the invention is to simplify the change of the contour of the extruded product of an extrusion machine and to reduce the number of changes of an extrusion head required to produce a given variety of extruded shapes.

Another object of the invention is to reduce the cost of an extrusion head change both as to the amount of labor and also as to the inoperative time involved on an extrusion head change.

Yet another object of the invention is to reduce the number of extrusion heads required to produce a desired number of extruded shapes.

A further and more specific object of the invention is to provide at least one removable baffle in an extrusion head to permit substitution of baffles to produce a variety of extrusion contours.

The foregoing and other objects and advantages of the invention, which will be made apparent as the specification proceeds, are achieved by the provision of the apparatus shown in the accompanying drawings, wherein:

Fig. 1 is a plan view of an extrusion head embodying the principles of the invention;

Fig. 2 is a front elevation of the extrusion head of Fig. 1;

Figs. 3 and 4 are enlarged vertical sections through the extreme sizes of dies that can be used with the disclosed extrusion head of the invention;

Fig. 5 is a fragmentary longitudinal vertical section, partly in elevation, taken on line 5—5 of Fig. 2;

Fig. 6 is a rear elevation of the extrusion head of the invention with the section 41 removed; and Figs. 7 through 14 are fragmentary vertical sections taken on lines 7—7 through 14—14 of Fig. 5, respectively.

Referring in detail to the drawings, an apertured extrusion head 40 is adapted to be secured to an end section 41 of an extrusion machine 10 in any conventional manner, such as by means of bolts 42. The extrusion head 40 is provided with an elongated material transmitting chamber 43 of substantially rectangular shape at its forward or discharge end, as shown in Fig. 7, gradually merging into a portion of circular cross section, as shown in Fig. 14 at the rearward, or stock receiving end thereof. The circular stock receiving end of the head 40 is adapted to be engaged with the mouth of the extrusion chamber of the machine 10 to complete the shaping of the extruded material by passage through the extrusion head 40.

In order to position the extrusion head 40 for easy movement to and from engagement with the end section 41, such section is provided with a pair of spaced, laterally directed, vertically aligned arms 20 which form a hinge with an apertured offset lug 21 on the extrusion head. A hinge pintle 24 extends through the arms 20 and lug 21 to secure the extrusion head 40 and the end section 41 pivotally together. Pivotal movement of the extrusion head exposes the stock receiving end thereof and is dependent upon the bolts 42 being removed.

Fig. 5 best shows that a die plate 25 may be removably positioned in the mouth or discharge end 43a of chamber 43. Stud bolts 26, with lock nuts 27, engage the head 40 and bear on the top of the die plate 25 to aid in retaining it in place. Screws 126 aid in securing the die plate 25 to the head 40. A front reenforce bar 28 is also provided to aid in securing the die plate 25 in position being pivotally carried by the extrusion head 40. A lug 29 is formed on the bar 28 at one end thereof and a hinge pintle 30 extends through lugs 29 and lugs 31 and 32 formed on one edge of the extrusion head 40 to position the bar 28 pivotally on the head.

Fig. 5 shows that the bar 28 may have adjustable support means associated with it to remove some of its weight from the pintle 30. These means may comprise an arm 33 secured to the lower surface of the discharge end of the extrusion head 40 at each side thereof. A screw 34 pivotally secures each arm 33 to the head 40, and a screw 35 with a lock nut 136 thereon is engaged with the free end of each arm 33 and bears on a flat surfaced lug 36 formed on the lower surface of the bar 28 at each end thereof. The lugs 36 have ramps 37 leading up to their flat surfaces so that pivotal movement of the bar 28 towards the extrusion head moves it to desired vertical reltionship therewith. Adjustment of the screws 35 controls the vertical position of the bar 28. The bar 28 is retained against the extrusion head 40 and die plate 25 by bolts 38.

In order to receive removable means for shaping the material being extruded, the chamber 43 is provided with a pair of diametrically opposed, axially directed recesses 44 formed therein, with undercut ribs 45 formed in the recesses 44 extending substantially the length of the chamber 43. Each of the ribbed recesses is adapted to engage with and position a baffle 46 by means of a dovetail joint with an undercut recess 47, formed in the radially outer surfaces of each of the baffles 46.

The various cross-sectional views shown in the drawings bring out how the walls of the chamber 43 of the extrusion head 40 and the shape of the baffles 46 are of widely varying form throughout the length of the extrusion head. When the extrusion head 40 is pivoted out of engagement with the extrusion machine 41, the baffles 46 can be slid or pulled out of engagement with the recesses 44 to permit the insertion of differently contoured baffles for change in the shape of the extruded material. In some instances, the baffles used with the extrusion head 40 may not be of such shape as to force stock flowing through the extrusion head out to the lateral extremities of the mouth 43a so that the die plate used must be adapted to form a contour of less width than the material is forced to assume when passing through the mouth 43a.

Figs. 3 and 4 show die plates 50 and 51 having die openings 54 and 55, respectively, therein representing the extreme sizes of tread formations formable from one extrusion head by variation of the baffle contour. A plurality of stock escape holes 53 may be provided in the die plate 51 adjacent each end thereof for use when the extrusion contour is appreciably narrowed. The material flowing through the holes 53 usually is returned to the extrusion machine for reextrusion.

Changes in the extruded shapes may be effected by changing the die plates used in conjunction with the baffle members 46, whereas major changes in the extruded shapes will normally require changing the baffles 46 in the easy manner pointed out hereinbefore. The baffles 46 may have means, as tapped holes (not shown) provided on their stock receiving ends at the portions thereof abutted against section 41 so that a pull out member could be engaged with the baffles to facilitate sliding or drawing them out of engagement with the recesses 44.

Conduits 51a connect to a conduit 52 which may be formed in the head 40 for circulation, usually, of cooling fluid therethrough.

Treads or other articles varying through extreme ranges in size, cannot be made on a single extrusion head when such sizes vary several inches in thickness and a foot or more in width. However, the number of extrusion heads required to produce a great variety of extruded shapes, is substantially reduced by the present invention, since practice requires a different extrusion head for substantially every extruded shape desired.

In some instances, it may be possible to obtain the desired flow or distribution of plastic material by use of only one baffle surface on either the top or bottom of the mouth or throat of an extrusion member.

One embodiment of the invention has been illustrated and described herein in detail but it will be realized that the invention is not restricted to the embodiment disclosed since the scope of the invention is defined in the appended claims.

What is claimed is:

1. An extrusion head for an extrusion machine, said head comprising a substantially tubular member having a chamber extending therethrough of circular cross section at one end for connecting to the remainder of an extrusion machine, said chamber being appreciably longer and narrower at the opposite end for shaping the material flowing therethrough, said chamber having a pair of diametrically opposed longitudinally directed recesses extending substantially the length thereof, and a pair of baffle members removably positioned in and engaged with the recesses in said tubular member but extending into said chamber whereby any of a plurality of differently contoured baffle members can be positioned in said tubular member to vary the flow of material through said chamber.

2. In an extrusion head for an extrusion machine, a substantially tubular member having a material transmitting chamber extending therethrough, said chamber being cylindrical at its receiving end but defining an elongated aperture at its discharge end, said chamber having at least one longitudinally directed recess formed in and extending substantially the length thereof, and a baffle member removably positioned in and engaged with the walls of said recess in said tubular member whereby any of a plurality of baffles are detachably receivable in said chamber to vary the flow of material therethrough.

3. An extrusion head for an extrusion machine, said head comprising a substantially tubular member having a chamber extending therethrough shaped at one end for receiving extruded material when connected to an extrusion chamber said chamber being of appreciably different cross-sectional shape at its discharge end than at its receiving end, a recess formed in the walls of said chamber, said recess extending from the receiving end at least part of the length thereof, and a baffle member removably positioned in and engaged with said recess, said baffle member extending into said chamber and forming a part only of the surface thereof to vary the flow of material flowing through the chamber.

4. An extrusion head for an extrusion machine, said head having a work transmitting passage therethrough, a groove formed in the wall of said opening and extending from its work receiving end substantially the length thereof, a baffle member removably positioned in and engaged with the walls of said groove, said baffle extending into said opening and having a contour which complements the contour of said opening whereby the contour of the opening may be changed by replacing one baffle with another of different contour.

CONRAD G. FORMAZ.

REFERENCES CITED

The following references are of record in the file of this patent:

UNITED STATES PATENTS

| Number | Name | Date |
|---|---|---|
| 1,252,821 | Lewis | Jan. 8, 1918 |
| 1,768,671 | Devine | July 1, 1930 |
| 1,768,790 | Royle | July 1, 1930 |
| 2,090,404 | Parkhurst | Aug. 17, 1937 |

FOREIGN PATENTS

| Number | Country | Date |
|---|---|---|
| 322,522 | Italy | Nov. 14, 1934 |